United States Patent
Chavan

(10) Patent No.: US 11,078,401 B2
(45) Date of Patent: Aug. 3, 2021

(54) RARE EARTH OXIDE AS A WEIGHTING AND BRIDGING AGENT

(71) Applicant: HALLIBURTON ENERGY SERVICES, INC., Houston, TX (US)

(72) Inventor: Sandeep Chavan, Mumbai (IN)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 225 days.

(21) Appl. No.: 16/467,346

(22) PCT Filed: Jul. 19, 2018

(86) PCT No.: PCT/US2018/042827
§ 371 (c)(1),
(2) Date: Jun. 6, 2019

(87) PCT Pub. No.: WO2020/018101
PCT Pub. Date: Jan. 23, 2020

(65) Prior Publication Data
US 2021/0155842 A1    May 27, 2021

(51) Int. Cl.
*E21B 37/08*  (2006.01)
*C09K 8/504*  (2006.01)
*E21B 21/00*  (2006.01)
*E21B 33/138* (2006.01)
*E21B 37/00*  (2006.01)
*E21B 21/06*  (2006.01)

(52) U.S. Cl.
CPC .......... *C09K 8/5045* (2013.01); *E21B 21/003* (2013.01); *E21B 33/138* (2013.01); *E21B 37/00* (2013.01); *E21B 37/08* (2013.01); *C09K 2208/18* (2013.01); *E21B 21/065* (2013.01)

(58) Field of Classification Search
None
See application file for complete search history.

(56) References Cited

U.S. PATENT DOCUMENTS

| | | |
|---|---|---|
| 2014/0094394 A1 | 4/2014 | Bishop et al. |
| 2014/0209307 A1 | 7/2014 | Jamison et al. |
| 2014/0342950 A1 | 11/2014 | McDaniel et al. |
| 2015/0068747 A1* | 3/2015 | Hwang ............... C09K 8/685 166/280.2 |
| 2015/0072901 A1* | 3/2015 | Samuel ............... C09K 8/516 507/104 |
| 2017/0240790 A1 | 8/2017 | Bryant et al. |
| 2017/0253784 A1 | 9/2017 | McDaniel et al. |
| 2018/0011215 A1* | 1/2018 | Vasquez ............... E21B 47/10 |
| 2018/0306027 A1* | 10/2018 | Sherman ............... E21B 47/11 |

OTHER PUBLICATIONS

International Search Report and Written Opinion, PCT/US2018/042827, Apr. 15, 2019, 10 pages, ISA/KR.

* cited by examiner

*Primary Examiner* — Andrew Sue-Ako
(74) *Attorney, Agent, or Firm* — Haynes and Boone, LLP

(57) ABSTRACT

Methods of treating a subterranean formation and treatment fluids are discussed herein. The methods generally include treating the subterranean formation with a rare earth oxide by providing a first treatment fluid having a density of at least about 10 pounds per gallon including a rare earth oxide; and introducing the first treatment fluid into the subterranean formation.

20 Claims, 3 Drawing Sheets

RARE EARTH OXIDE AS A WEIGHTING AND BRIDGING AGENT

PRIORITY

The present application is a U.S. National Stage patent application of International Patent Application No. PCT/US2018/042827, filed on Jul. 19, 2018, the benefit of which is claimed and the disclosure of which is incorporated herein by reference in its entirety.

BACKGROUND

The present disclosure relates generally to treatment fluids and methods for treating subterranean formations. In particular, the present disclosure relates to treatment fluids that include a rare earth oxide as a weighting and bridging agent and methods of using the treatment fluids.

Wellbore fluids serve many important functions throughout the process in drilling for oil and gas. One such function is cooling and lubricating the drill bit as it grinds though the earth's crust. As the drill bit descends, it generates "cuttings," or small bits of stone, clay, shale, or sand. A wellbore fluid serves to transport these cuttings back up to the earth's surface. As drilling progresses, large sections of pipe called "casings" are inserted into the well to line the borehole and provide stability. Uncased sections of the borehole, which are exposed to the high pressures of the reservoir, must be stabilized before casing can be set; otherwise, a reservoir "kick" or, in the extreme case, a "blowout"—a catastrophic, uncontrolled inflow of reservoir fluids into the wellbore—may occur. A wellbore fluid, if monitored properly, can provide sufficient pressure stability to counter this inflow of reservoir fluids.

Wellbore fluids can also deposit filter cake on the walls of wellbores within producing formations to substantially prevent drilling, servicing, and completion fluids from being lost into the formation and solids from entering into the porosities of the formation. After the drilling or servicing operation has been completed, the filter cake is removed prior to placing the formation on production. Removal of the filter cake has typically been accomplished by including a water, oil, or acid soluble particulate solid bridging agent in the treatment fluid for bridging over the formation pores or other opening and then dissolving the filter cake with water, oil or acid as appropriate. Such areas include formation pore throats, gravel packs, sand screens, or fractures in the formation as well as openings such as cracks in tubing or casing, holes in sand screens, or on other perforations downhole. By bridging across such areas, the bridging agents (which can be combined with a fluid loss control additive) form a substantially impermeable "filter cake" on that area that prevents loss of treatment fluids to the surrounding formation.

A critical property differentiating the effectiveness of various wellbore fluids in achieving these functions is density, or mass per unit volume. The wellbore fluid must have sufficient density in order to carry the cuttings to the surface. Density also contributes to the stability of the borehole by increasing the pressure exerted by the wellbore fluid onto the surface of the formation downhole. The column of fluid in the borehole exerts a hydrostatic pressure (also known as a head pressure) proportional to the depth of the hole and the density of the fluid. Therefore, one can stabilize the borehole and prevent the undesirable inflow of reservoir fluids by carefully monitoring the density of the wellbore fluid to ensure that an adequate amount of hydrostatic pressure is maintained.

It has long been desired to increase the density of wellbore fluids, and a variety of methods exist. One method is adding dissolved salts such as sodium chloride, calcium chloride, and calcium bromide in the form of an aqueous brine to wellbore fluids. Another method is adding inert, high-density particulates to wellbore fluids to form a suspension of increased density. These inert, high-density particulates often are referred to as "weighting agents" and typically include powdered minerals of barite, calcite, or hematite.

Calcium carbonate is widely used as a weighting and bridging agent in combination with high density brines. Calcium carbonate, however, has limitations in terms of having a specific gravity of only about 2.7. To achieve high densities or mud weights (e.g., greater than 20 pounds per gallon (ppg)), large quantities of calcium carbonate are typically used in combination with high density brines, such as those containing zinc bromide or cesium formate. These brines, however, are expensive and considered toxic. Furthermore, the use of large amounts of calcium carbonate may be detrimental to the reservoir because any excess calcium carbonate may block micropores in a formation if it is not completely removed by acid.

Thus, there is a continuing need for improved methods and compositions for treating subterranean formations with high mud weight wellbore fluids.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
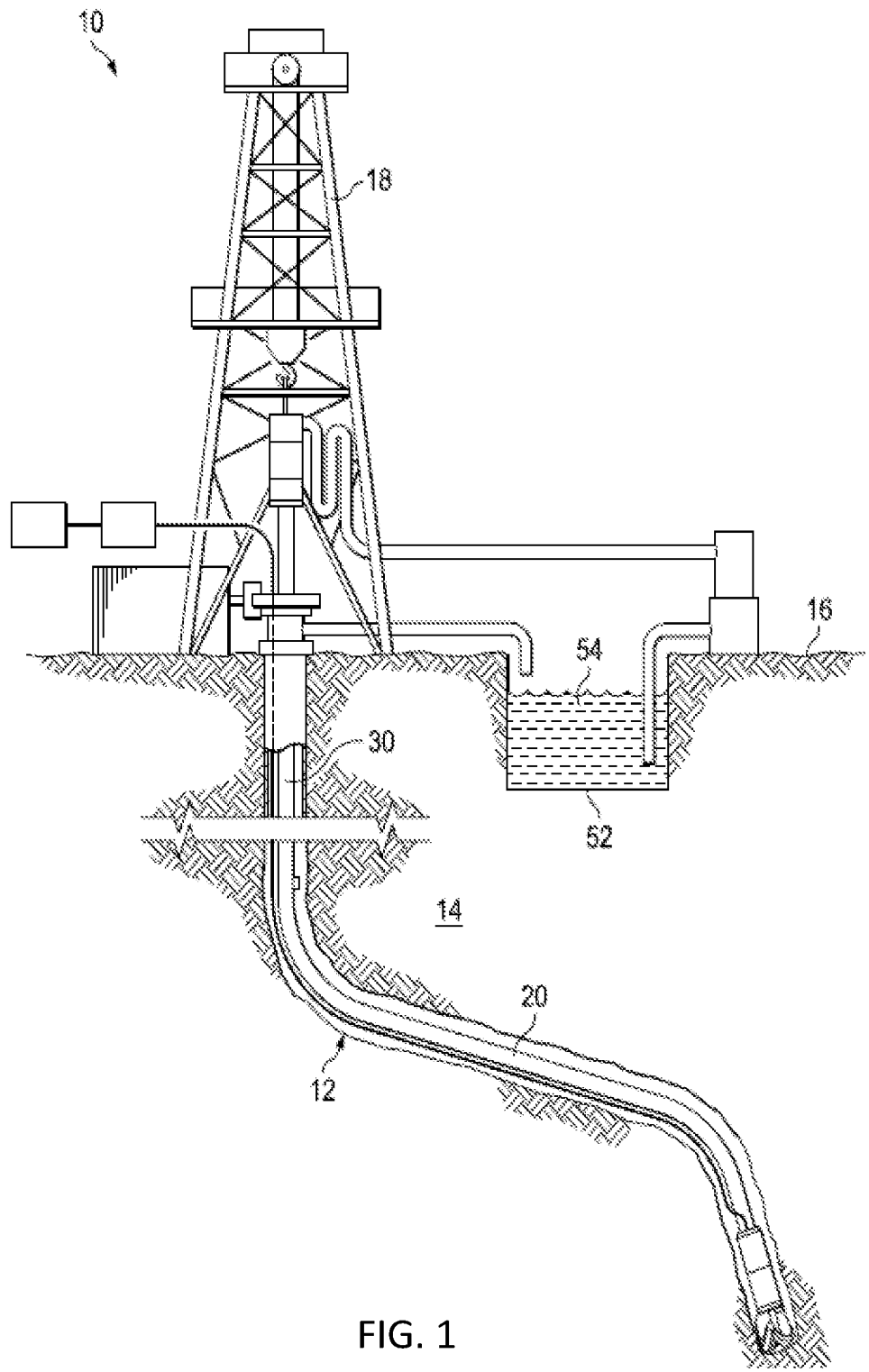
FIG. 1 illustrates a land-based drilling and production system.

Methods are provided for treating subterranean formations using a rare earth metal oxide ("rare earth oxide") as a weighting and bridging agent to provide extremely high mud weights (e.g., greater than about 30 ppg) for drilling through a reservoir section of the subterranean formation. Such treatment operations can include, for example, drilling operations, stimulation operations, production operations, remediation operations, sand control treatments, and the like. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, acidizing operations, scale dissolution and removal operations, loss circulation operations, sand control operations, consolidation operations, antisludge operations, and the like. Treatment fluids with high mud weights can provide increased stability to formations by controlling hydrostatic pressure and preventing unwanted flow into the wellbore. The pressure exerted by the treatment fluid at any depth is related to its density.

In one or more embodiments, the weighting and bridging agent can include any high density rare earth oxide such as gadolinium oxide ($Gd_2O_3$) (specific gravity: 7.40), yttrium oxide ($Y_2O_3$) (specific gravity: 5.01), lanthanum oxide ($La_2O_3$) (specific gravity: 6.51), cerium oxide ($Ce_2O_3$) (specific gravity: 7.22), praseodymium oxide ($Pr_6O_{11}$) (specific gravity: 6.5), neodymium oxide ($Nd_2O_3$) (specific gravity: 7.24), $Sm_2O_3$ (specific gravity: 8.34), europium oxide ($Eu_2O_3$) (specific gravity: 7.42), terbium oxide ($Tb_4O_7$) (specific gravity: 7.3), dysprosium oxide ($Dy_2O_3$) (specific gravity: 7.81), holmium oxide ($Ho_2O_3$) (specific gravity: 8.41), erbium oxide ($Er_2O_3$) (specific gravity: 8.64), thulium oxide ($Tm_2O_3$) (specific gravity: 8.6), ytterbium oxide ($Yb_2O_3$) (specific gravity: 9.2), samarium oxide ($Sm_2O_3$) (specific gravity: 8.35), and/or lutetium oxide ($Lu_2O_3$) (specific gravity: 9.42).

In one or more embodiments, the rare earth oxide is used to increase the treatment fluid density to provide at least one function selected from controlling formation pressure, maintaining borehole stability, and preventing the introduction of formation fluids into a borehole.

In one or more embodiments, the rare earth oxide may be included in any suitable treatment fluid. As used herein, a "treatment fluid" refers to a fluid used to drill, complete, work over, fracture, repair, or in any way prepare a wellbore for the recovery of materials residing in a subterranean formation penetrated by the wellbore. Examples of treatment fluids include, but are not limited to, cement slurries, drilling fluids or muds, spacer fluids, and fracturing fluids or completion fluids. It is to be understood that "subterranean formation" encompasses both areas below exposed earth and areas below earth covered by water such as ocean or fresh water.

In one or more embodiments, a treatment fluid that includes a rare earth oxide is provided. In one or more embodiments, the rare earth oxide is present in the treatment fluid in an amount based on the desired density of the treatment fluid. The rare earth oxide may be present in the treatment fluid in an amount sufficient for a particular application to provide a particular density. In one or more embodiments, the rare earth oxide is present in the treatment fluid in an amount in a range of from about 1 to about 70% by weight of the treatment fluid (e.g., about 5%, about 10%, about 20%, about 30%, about 40%, about 50%, about 60%, about 70% including all values in between and fractions thereof). In one or more embodiments, the rare earth oxide is present in the treatment fluid in an amount in a range of from about 1% to about 70% by weight of the treatment fluid (e.g., about 5% to about 70% by weight of the treatment fluid).

In one or more embodiments, a treatment fluid including the rare earth oxide and having a density of 20 ppg or less, or in a point in a range of from about 10 ppg to about 20 ppg, or in a point in a range of from about 20 ppg to about 25 ppg, for example, is provided. In one or more embodiments, the density of the treatment fluid with the rare earth oxide is in a point in a range of from about 25 ppg to about 30 ppg. In one or more embodiments, the density of the treatment fluid with the rare earth oxide is in a point in a range of from about 30 ppg to about 35 ppg.

In one or more embodiments, the treatment fluid further includes any number of additives that are commonly used in treatment fluids including, for example, surfactants, antioxidants, polymer degradation prevention additives, relative permeability modifiers, foaming agents, defoaming agents, antifoaming agents, emulsifying agents, de-emulsifying agents, proppants or other particulates, salts, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, and catalysts. Combinations of these additives can be used as well.

In one or more embodiments, the treatment fluid further includes other weighting and bridging agents, including but not limited to, barite, ilmenite, magnetite, hematite, calcium carbonate, and/or marble. In one or more embodiments, the rare earth oxide is combined with the other weighting and bridging agent in a single treatment fluid. In one or more embodiments, the rare earth oxide and the other weighting and bridging agents are introduced into the formation separately.

In one or more embodiments, the treatment fluid can be made to contact the subterranean formation by any suitable method that provides effective contact between the treatment fluid and the subterranean formation. The treatment fluid utilized can be used in conjunction with drilling, well injecting, gravel packing, fracturing or other operations performed on the subterranean formation. For example, the treatment fluid containing the rare earth oxide can be used in conjunction with drilling, stimulation, or completion operations to alleviate the damage otherwise caused by drilling, stimulation, or completion fluids.

In one or more embodiments, treatment fluids employing the rare earth oxide may be useful during drilling, cementing, completion (including perforation), well intervention or work-over, hydraulic fracturing or acidification and as a packer fluid. One of ordinary skill in the art will recognize the utility of treatment fluids incorporating the rare earth oxide in other applications. As further discussed below, a rare earth oxide provides high performance in drilling through the reservoir section by virtue of reduced solids content, which lowers formation pore blocking/sealing, which in turn leads to enhanced production. The rare earth oxide can also achieve a density of a point in a range of from about 10 ppg to about 35 ppg and higher for treatment fluids.

In one or more embodiments, the weighting and bridging agent includes samarium oxide. It should be understood that samarium oxide is only used as an example, and any of the above-mentioned high density rare earth oxides may be used as an alternative or in combination with samarium oxide as a weighting and bridging agent.

The use of samarium oxide provides flexibility in achieving both lower mud weights of about 10 ppg and high mud weights of about 30 to about 35 ppg for drilling through the reservoir section of a formation. The specific gravity of samarium oxide is relatively high at about 8.35 (or 69 ppg), which is more than 200% greater than the specific gravity of calcium carbonate. Advantageously, samarium oxide can be used to formulate treatment fluids having a range of densities.

Moreover, rare earth oxides have higher specific gravities than calcium carbonate so less rare earth oxide needs to be used to provide a treatment fluid having a specific density. Less rare earth oxide needs to be used, which avoids excessive pore blockage in the reservoir section. Pore blockage can reduce permeability and therefore production of the formation.

Rare earth oxides are generally soluble in acids. For example, samarium oxide is soluble in various acids such as hydrochloric acid (HCl), nitric acid ($HNO_3$), etc. Rare earth oxides can therefore act as a bridging agent and be removed in a manner similar to calcium carbonate. Bridging agents temporarily block or seal micropores in a formation by building a filter cake to reduce fluid loss to and from the formation. A filter cake can limit drilling fluid losses from the well bore and protect the natural formation from possible damage by the fluids permeating into the well bore. Common bridging agents include calcium carbonate, suspended salts, or oil-soluble resins. Advantageously, less acid may be used for removal of the rare earth oxide as the bridging agent due a lower concentration of rare earth oxide used.

In one or more embodiments, the rare earth oxide is selected to have a high solubility in acid (e.g., at least 80% or greater of the rare earth oxide dissolves in acid, or 90% or greater, or 95% or greater). In one or more embodiments, if a first rare earth oxide has a higher acid solubility than a second rare earth oxide, the first rare earth oxide is selected as the weighting and bridging agent.

Rare earth oxides can also provide better control of fluid rheological properties, such as viscosity. Because the use of rare earth oxide leads to a lower overall solids content, treatment fluids with lower viscosities can be used. Lower viscosity treatment fluids can put less pressure on pumps, increase the rate of penetration, prevent lost circulation, and enhance wellbore stability.

Additionally, high density brines such as zinc bromide, cesium formate, etc. can be substituted by cheaper and less toxic brines such as calcium chloride, sodium chloride, etc. to achieve similar or even higher mud weights. Use of such high density brines is no longer needed since the rare earth oxide can provide the treatment fluid with a high mud weight.

A rare earth oxide, though more expensive than calcium carbonate, can be regenerated and reused. Thus, overall costs can be controlled. In one or more embodiments, any excess rare earth oxide that doesn't get deposited on the walls of the wellbore as part of the filter cake can be reused by direct separation when a drilling fluid returns to the surface after treatment is completed. Since the specific gravity of the rare earth oxide is high (e.g., at least 5), separation is relatively fast in settling tanks, which is followed by filtration via a solid control unit.

In one or more embodiments, regeneration or recycling of solubilized rare earth oxide after the acid treatment process can be achieved by the use of precipitating agents such as hydroxide (e.g., sodium hydroxide, lime, and/or ammonium hydroxide), or oxalates (e.g., oxalic acid), etc.

In one or more embodiments, once precipitated, the solid rare earth metal precipitate can be filtered with any solid control unit at rig side such as a shale shaker, centrifuge, or rotary drum vacuum filter. The separated solids are then calcined at temperatures in a range of from about 350° C. to about 1200° C., for example about 400° C. to about 1000° C., or from about 450° C. to about 900° C., to yield a rare earth oxide in the form of powder and reused as a weighting and bridging agent. In one or more embodiments, the yield is about 90% or greater, or 92% or 95%.

In one or more embodiments, the precipitation can be carried out in a glass lined reactor vessel to handle the mild acid. Alternatively, the precipitation can be carried out as a continuous process with inline mixers since the precipitation is spontaneous and is achieved at ambient conditions.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide or some other type of fluid. In one or more embodiments, working fluid 54 includes samarium oxide.

Figure 2:
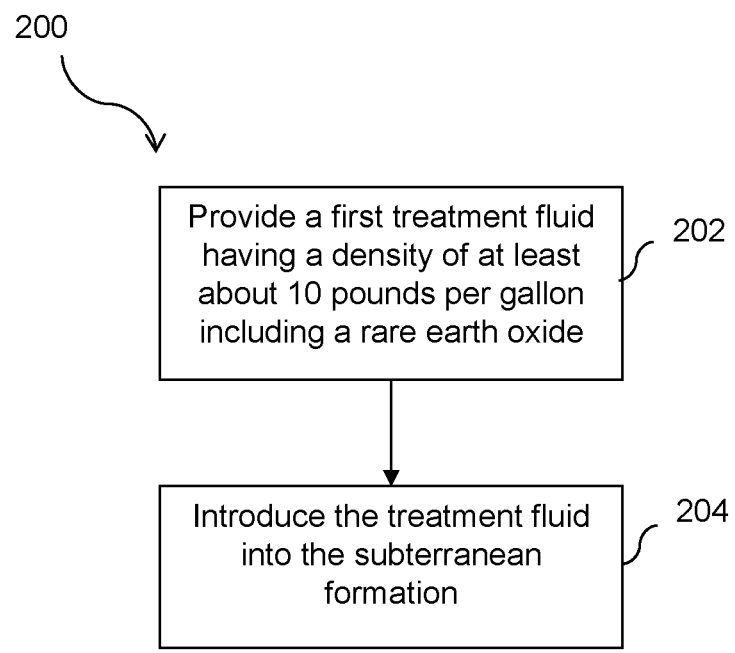
FIG. 2 depicts a method of treating a subterranean formation according to one or more embodiments.

According to one or more embodiments, a method of treating a subterranean formation is provided. Turning now to FIG. 2, the method 200 includes providing a first treatment fluid having a density of at least 10 pounds per gallon (ppg) including a rare earth oxide in step 202, and introducing the treatment fluid into the subterranean formation in step 204. The term "introducing," as used herein, includes pumping, injecting, pouring, releasing, displacing, spotting, circulating, or otherwise placing a fluid or material within a well, wellbore, or subterranean formation using any suitable manner known in the art.

Figure 3:
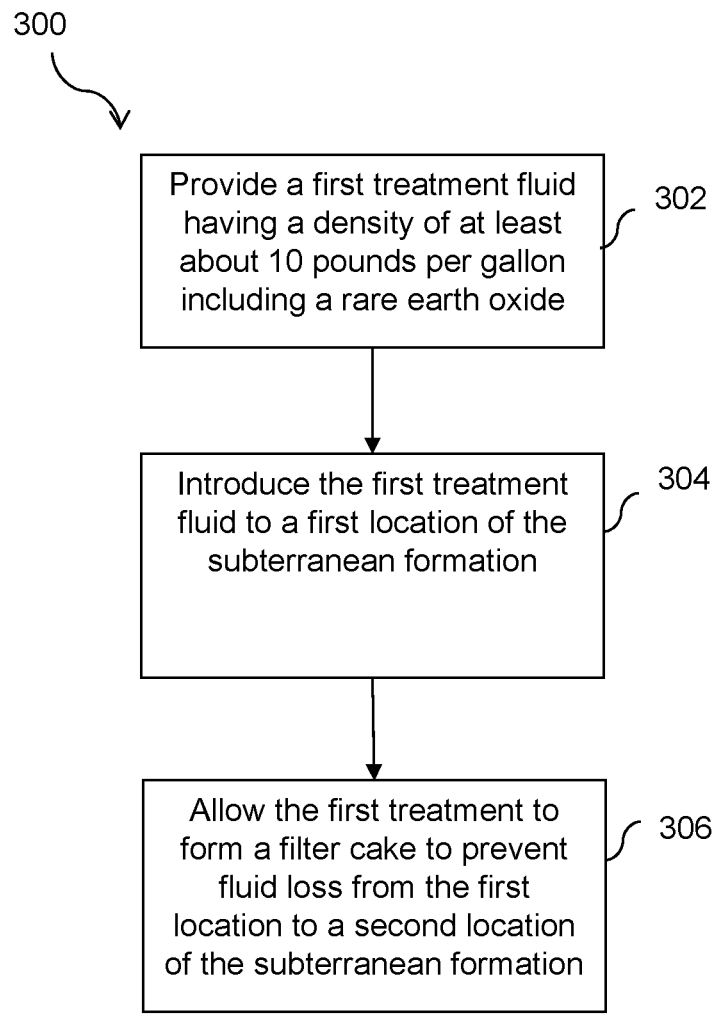
FIG. 3 depicts another method of treating a subterranean formation according to one or more embodiments.

In one or more embodiments, a method of preventing fluid loss in a subterranean formation is provided. Turning now to FIG. 3, the method 300 includes providing a first treatment fluid having a density of at least about 10 pounds per gallon (ppg) including a rare earth oxide in step 302, introducing the first treatment fluid to a first location of the subterranean formation in step 304, and allowing the first treatment fluid to form a filter cake to prevent fluid loss from the first location to a second location of the subterranean formation in step 306.

Thus, a method of treating a subterranean formation is provided. Embodiments of the method may generally include providing a first treatment fluid having a density of at least about 10 pounds per gallon (ppg) including a rare earth oxide; and introducing the first treatment fluid into the subterranean formation.

In one or more embodiments, the rare earth oxide includes samarium oxide. In one or more embodiments, the rare earth oxide includes one or more of gadolinium oxide, yttrium oxide, lanthanum oxide, cerium oxide, praseodymium oxide, neodymium oxide, samarium oxide, europium oxide, terbium oxide, dysprosium oxide, holmium oxide, erbium oxide, thulium oxide, ytterbium oxide, or lutetium oxide. In one or more embodiments, the density of the first treatment fluid is lower than about 20 ppg, for example in a point in a range of from about 10 to about 20 ppg. In one or more embodiments, the density of the first treatment fluid is in a point in a range of from about 20 to about 25 ppg. In one or more embodiments, the density of the first treatment fluid is in a point in a range of from about 25 to about 30 ppg. In one or more embodiments, the density of the first treatment fluid is in a point in a range of from about 30 to about 35 ppg. In one or more embodiments, the density of the first treatment fluid is higher than about 35 ppg. For any of the foregoing embodiments, the method may include any one of the following, alone or in combination with each other.

In one or more embodiments, the method further includes introducing an acid into the subterranean formation. In one or more embodiments, the method further includes allowing the acid to dissolve the rare earth oxide. The acid may be, for example, hydrochloric acid and/or nitric acid.

In one or more embodiments, the method further includes re-using the rare earth oxide in a second treatment fluid. For example, re-using the rare earth oxide includes precipitating dissolved rare earth metal in the first treatment fluid; separating the precipitated rare earth metal from the first treatment fluid (e.g., filtering); and calcining the separated rare earth metal to yield recycled rare earth oxide. The recycled rare earth oxide may be mixed with the second treatment fluid and introduced in another subterranean formation to provide cost savings.

In one or more embodiments, the rare earth oxide is present in the first treatment fluid in an amount of about 1 percent to about 70 percent by weight of the first treatment fluid. In one or more embodiments, the rare earth oxide is present in the first treatment fluid in an amount of about 5 percent to about 70 percent by weight of the first treatment fluid. In one or more embodiments, the density of the first treatment fluid is about 10 ppg to about 35 ppg.

A method of preventing fluid loss in a subterranean formation is also provided. The method includes providing a first treatment fluid having a density of at least about 10 pounds per gallon (ppg) including a rare earth oxide; introducing the first treatment fluid to a first location of the subterranean formation; and allowing the first treatment fluid to form a filter cake to prevent fluid loss from the first location to a second location of the subterranean formation. In one or more embodiments, the density of the first treatment fluid is in a point in a range of about 20 ppg to about 30 ppg, or higher. For any of the foregoing embodiments, the method may include any one of the following, alone or in combination with each other.

In one or more embodiments, the rare earth oxide includes samarium oxide. In one or more embodiments, the rare earth oxide includes one or more of gadolinium oxide, yttrium oxide, lanthanum oxide, cerium oxide, praseodymium oxide, neodymium oxide, samarium oxide, europium oxide, terbium oxide, dysprosium oxide, holmium oxide, erbium oxide, thulium oxide, ytterbium oxide, or lutetium oxide.

In one or more embodiments, the method further includes introducing an acid into the subterranean formation; and allowing the acid to dissolve the filter cake. The acid could include mineral acids such as hydrochloric acid and/or nitric acid, any organic acids, such as acetic acid, or any acid generated by means of delayed ester hydrolysis.

In one or more embodiments, the method further includes re-using the rare earth oxide in a second treatment fluid. In one or more embodiments, re-using the rare earth oxide includes precipitating dissolved rare earth metal in the first treatment fluid with a hydroxide (e.g., sodium or ammonium hydroxide) or an oxalate (e.g., oxalic acid); separating the precipitated rare earth metal from the first treatment fluid; and calcining the separated rare earth metal to yield recycled rare earth oxide. In one or more embodiments, the method further includes mixing the recycled rare earth oxide with the second treatment fluid.

In one or more embodiments, the rare earth oxide is present in the first treatment fluid in an amount in a range of from about 1% to about 70% by weight of the first treatment fluid. In one or more embodiments, the rare earth oxide is present in the first treatment fluid in an amount in a range of from about 5% to about 70% by weight of the first treatment fluid. In one or more embodiments, the density of the first treatment fluid is in a point in a range of from about 10 ppg to about 35 ppg.

A wellbore treatment fluid is also provided. The treatment fluid includes a base fluid; and a rare earth oxide present in an amount in a range of from about 1% to 70% by weight of the treatment fluid. The treatment fluid has a density of at least about 10 pounds per gallon (ppg). The base fluid can include (1) water (e.g., fresh water, seawater, brine, saturated brine, formate brine, chloride brines or a water-and-clay based composition), (2) a petroleum product, such as diesel fuel, kerosene, fuel oil, crude oil, or mineral oil, or (3) a synthetic oil.

In one or more embodiments, the rare earth oxide includes samarium oxide. In one or more embodiments, the rare earth oxide includes one or more of gadolinium oxide, yttrium oxide, lanthanum oxide, cerium oxide, praseodymium oxide, neodymium oxide, samarium oxide, europium oxide, terbium oxide, dysprosium oxide, holmium oxide, erbium oxide, thulium oxide, ytterbium oxide, or lutetium oxide.

In one or more embodiments, the treatment fluid has a density in a point in a range of from about 10 ppg to about 35 ppg.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation, comprising:
    providing a first treatment fluid having a density of at least about 10 pounds per gallon (ppg) comprising samarium oxide;
    introducing the first treatment fluid into the subterranean formation;
    allowing the first treatment fluid to deposit a filter cake on the subterranean formation;
    introducing an acid or acid precursor into the subterranean formation; and
    allowing the acid or an acid generated from the acid precursor to dissolve the filter cake.

2. The method of claim 1, further comprising re-using the samarium oxide in a second treatment fluid.

3. The method of claim 2, wherein re-using the samarium oxide comprises:
    precipitating dissolved samarium in the acid-dissolved filter cake;
    separating the precipitated samarium from the acid-dissolved filter cake; and
    calcining the separated samarium to yield recycled samarium oxide.

4. The method of claim 3, further comprising mixing the recycled samarium oxide with a second treatment fluid.

5. The method of claim 1, wherein the samarium oxide is present in the first treatment fluid in an amount in a range of from about 1% to about 70% by weight of the first treatment fluid.

6. The method of claim 5, wherein the samarium oxide is present in the first treatment fluid in an amount in a range of from about 5% to about 70% by weight of the first treatment fluid.

7. The method of claim 1, wherein the density of the first treatment fluid is in a point in a range of from about 10 ppg to about 35 ppg.

8. The method of claim 7, wherein the density of the first treatment fluid is about 10 ppg.

9. The method of claim 7, wherein the density of the first treatment fluid is in a point in a range of from about 20 ppg to about 25 ppg.

10. The method of claim 1, wherein the first treatment fluid further comprises a weighting and bridging agent.

11. A method of preventing fluid loss in a subterranean formation, comprising:
   providing a first treatment fluid having a density of at least about 10 pounds per gallon (ppg) comprising samarium oxide;
   introducing the first treatment fluid to a first location of the subterranean formation;
   allowing the first treatment fluid to form a filter cake to prevent fluid loss from the first location to a second location of the subterranean formation;
   introducing hydrochloric acid or nitric acid into the subterranean formation; and
   allowing the hydrochloric acid or nitric acid to dissolve the filter cake.

12. The method of claim 11, further comprising re-using the samarium oxide in a second treatment fluid.

13. The method of claim 12, wherein re-using the samarium oxide comprises:
   precipitating dissolved samarium in the acid-dissolved filter cake with a hydroxide or an oxalate;
   separating the precipitated samarium from the acid-dissolved filter cake; and
   calcining the separated samarium to yield recycled samarium oxide.

14. The method of claim 13, further comprising mixing the recycled samarium oxide with a second treatment fluid.

15. The method of claim 11, wherein the samarium oxide is present in the first treatment fluid in an amount in a range of from about 1% to about 70% by weight of the first treatment fluid.

16. The method of claim 15, wherein the samarium oxide is present in the first treatment fluid in an amount in a range of from about 5% to about 70% by weight of the first treatment fluid.

17. The method of claim 11, wherein the density of the first treatment fluid is in a point in a range of from about 10 ppg to about 35 ppg.

18. The method of claim 17, wherein the density of the first treatment fluid is about 10 ppg.

19. The method of claim 17, wherein the density of the first treatment fluid is in a point in a range of from about 20 ppg to about 25 ppg.

20. The method of claim 11, wherein the first treatment fluid further comprises a weighting and bridging agent.

* * * * *